(12) United States Patent
Tsai et al.

(10) Patent No.: US 10,954,950 B2
(45) Date of Patent: Mar. 23, 2021

(54) FAN CONTROL DEVICE WITH MULTIPROCESSOR

(71) Applicant: Delta Electronics, Inc., Taoyuan (TW)

(72) Inventors: Chia Ching Tsai, Taoyuan (TW); Yueh Lung Huang, Taoyuan (TW); Yen Hung Chen, Taoyuan (TW); Che Hung Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 151 days.

(21) Appl. No.: 15/957,371

(22) Filed: Apr. 19, 2018

(65) Prior Publication Data

US 2018/0238335 A1    Aug. 23, 2018

Related U.S. Application Data

(63) Continuation of application No. 14/824,429, filed on Aug. 12, 2015, now abandoned.

(30) Foreign Application Priority Data

Aug. 12, 2014   (CN) .......................... 201410394680.X

(51) Int. Cl.
F04D 27/00    (2006.01)
(52) U.S. Cl.
CPC ......... *F04D 27/004* (2013.01); *F04D 27/001* (2013.01)
(58) Field of Classification Search
None
See application file for complete search history.

(56) References Cited

U.S. PATENT DOCUMENTS 6,188,189 B1    2/2001  Blake
6,956,342 B1   10/2005  Fang
(Continued)

FOREIGN PATENT DOCUMENTS

CN    101545497 A    9/2009
CN    101581933 A   11/2009
(Continued)

OTHER PUBLICATIONS

European Search Report dated Jan. 16, 2013 in corresponding EP Application No. 15180718.7 (7 pages).

*Primary Examiner* — Mohammad Ali
*Assistant Examiner* — Saad M Kabir
(74) *Attorney, Agent, or Firm* — Muncy, Geissier, Olds and Lowe, P.C,

(57) ABSTRACT

A fan control device for controlling a fan includes a communication-processing processor, a fan-controlling processor, and a detection processor. The communication-processing processor receives a fan-controlling instruction from an external system to generate a control signal, generates a detection signal according to a detection request of the external system, and provides state information for the external system. The fan-controlling processor controls the speed of the fan according to the control signal and transmits a control result to the communication-processing processor. The detection processor detects the ambient state and the fan state of the fan according to the detection signal, and generates the state information according to the ambient state and the fan state. The communication-processing processor, the fan-controlling processor, and the detection processor are physically separated from one another.

3 Claims, 3 Drawing Sheets

(56) References Cited

U.S. PATENT DOCUMENTS

| | | |
|---|---|---|
| 7,103,761 B2 | 9/2006 | Larson et al. |
| 2003/0234630 A1 | 12/2003 | Blake |
| 2004/0186629 A1 | 9/2004 | Frankel et al. |
| 2005/0257537 A1 | 11/2005 | Chang et al. |
| 2006/0037334 A1 | 2/2006 | Tien et al. |
| 2007/0248467 A1 | 10/2007 | Shahi et al. |
| 2007/0297893 A1 | 12/2007 | Alon et al. |
| 2010/0291858 A1 | 11/2010 | Toy |
| 2014/0163918 A1 | 6/2014 | Wang |

FOREIGN PATENT DOCUMENTS

| | | |
|---|---|---|
| CN | 201622455 U | 11/2010 |
| CN | 201916228 U | 8/2011 |
| CN | 103363620 A | 10/2013 |
| CN | 103644136 A | 3/2014 |
| TW | M390647 | 10/2010 |

FAN CONTROL DEVICE WITH MULTIPROCESSOR

CROSS REFERENCE TO RELATED APPLICATIONS

This Application claims priority of China Patent Application No. 201410394680.X, filed on Aug. 12, 2014, the entirety of which is incorporated by reference herein.

The present application is a continuation application of and claims priority from U.S. patent application Ser. No. 14/824,429, filed Aug. 12, 2015, the content of which is hereby incorporated by reference in its entirety.

BACKGROUND OF THE INVENTION

Field of the Invention

The disclosure relates generally to devices for controlling fans, and more particularly to a device with a multiprocessor for controlling fans.

Description of the Related Art

In an electronic system, such as a computer system, a cooling fan plays a key role in maintaining the proper functioning of the electronic system. The system would be permanently damaged if the excess heat could not be removed. Due to the complexity of modern electronic systems, cooling fans must do more than just cool air: extra features include controlling the speed of the fan, monitoring pulses on a tachometer to determine the instant speed of the fan, and detecting whether the fan becomes disabled or the speed is slower than expected.

Most fans that have recently been released on the market are designed to have a single control unit. There are two methods by which fans with such a motor design are controlled: one is with analog control signals, and the other is with digital control signals. The method that uses analog control signals controls the speed of the motor by using different voltage signals. The main advantage of using analog control signals is that the control circuit of the system is simpler, but the stability of the speed and the resolution of speed control are much worse than in the method that uses digital control signals.

The method that uses digital control signals controls the speed of the motor by communicating or adjusting the duty cycle of control signals. The main advantage of using digital control signals is its powerful subsidiary functions which are able to control or read more information. However, since the speed of communication has been rapidly improved with each passing day and there are more desired functions, the control unit of the motor can be overloaded, and so the motor-control function is limited. Therefore, a motor-control architecture with high efficiency is urgently needed to achieve a high quality and high efficacy in controlling a motor.

BRIEF SUMMARY OF THE INVENTION

To solve the problems described above, the invention provides a fan control device with multiprocessor.

In an embodiment, a fan control device for controlling a fan comprises a communication-processing processor, a fan-controlling processor, and a detection processor. The communication-processing processor receives a fan-controlling instruction from an external system to generate a control signal, generates a detection signal according to a detection request of the external system, and provides state information for the external system. The fan-controlling processor controls the speed of the fan according to the control signal, and transmits a control result to the communication-processing processor. The detection processor detects the ambient state and the fan state of the fan according to the detection signal, and generates state information according to the ambient state and the fan state. The communication-processing processor, the fan-controlling processor, and the detection processor are physically separated from one another.

In an embodiment of the fan control device, the fan-controlling processor further comprises a speed-controlling unit and a start-controlling unit. The speed-controlling unit controls the speed of the fan according to the control signal. The start-controlling unit controls the fan to start or stop according to the controlling signal. The speed-controlling unit and the start-controlling unit are physically separated from each other.

In an embodiment of the fan control device, any one of the communication-processing processor, the speed-controlling unit, and the start-controlling unit is individually packaged.

In an embodiment of the fan control device, the detection processor comprises a temperature-detecting unit, a speed-detecting unit, a current-detecting unit, and a voltage-detecting unit. The temperature-detecting unit detects temperature information according to the detection signal. The temperature information comprises ambient-temperature information and fan-temperature information. The speed-detecting unit detects speed information of the fan according to the detection signal. The current-detecting unit detects current information of the fan according to the detection signal. The voltage-detecting unit, detecting voltage information of the fan according to the detection signal. Each of the temperature-detecting unit, the speed-detecting unit, the current-detecting unit, and the voltage-detecting unit comprises a sensor, and the communication-processing processor, the temperature-detecting unit, the speed-detecting unit, the current-detecting unit, and the voltage-detecting unit are physically separated from one another.

In an embodiment of the fan control device, any one of the communication-processing processor, the temperature-detecting unit, the speed-detecting unit, the current-detecting unit, and the voltage-detecting unit is individually packaged.

In an embodiment of the fan control device, the external system is a human-computer interface system, the human-computer interface system generates the fan-controlling instruction according to an operation instruction of a user, and the speed of the fan is controlled by the control signal generated by the communication-processing processor. The human-computer interface system further generates the detection request according to the operation instruction, requests the detection processor to detect the ambient state and the fan state of the fan by the communication-processing processor generating the detection signal, and then the human-computer interface system displays the state information transmitted by the communication-processing processor.

In an embodiment, a fan control device for controlling a fan comprises a communication-processing processor, a speed-controlling unit, a start-controlling unit, a temperature-detecting unit, a speed-detecting unit, a current-detecting unit, and a voltage-detecting unit. The communication-processing processor receives a fan-controlling instruction from an external system to generate a control signal, generates a detection signal according to a detection request of the external system, and provides state information for the external system. The speed-controlling unit controls the speed of the fan according to the control signal, and transmits a control result to the communication-processing processor. The start-controlling unit controls the fan to start or stop according to the control signal, and transmits a report signal to the communication-processing processor. The report signal indicates that the fan has been successfully started or stopped. The temperature-detecting unit detects temperature information according to the detection signal. The temperature information comprises ambient-temperature information and fan-temperature information. The speed-detecting unit detects speed information of the fan according to the detection signal. The current-detecting unit detects current information of the fan according to the detection signal. The voltage-detecting unit detects voltage information of the fan according to the detection signal. Each of the temperature-detecting unit, the speed-detecting unit, the current-detecting unit, and the voltage-detecting unit comprises a sensor, and the communication-processing processor, the temperature-detecting unit, the speed-detecting unit, the current-detecting unit, and the voltage-detecting unit are physically separated from one another.

In an embodiment of the fan control device, any one of the communication-processing processor, the speed-controlling unit, the start-controlling unit, the temperature-detecting unit, the speed-detecting unit, the current-detecting unit, and the voltage-detecting unit is individually packaged.

In an embodiment of the fan control device, the external system is a human-computer interface system, the human-computer interface system generates the fan-controlling instruction according to an operation instruction of a user, and the speed of the fan is controlled by the control signal generated by the communication-processing processor. The human-computer interface system further generates the detection request according to the operation instruction, requests the detection processor to detect the ambient state and the fan state of the fan by the communication-processing processor generating the detection signal, and then the human-computer interface system displays the state information transmitted by the communication-processing processor.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
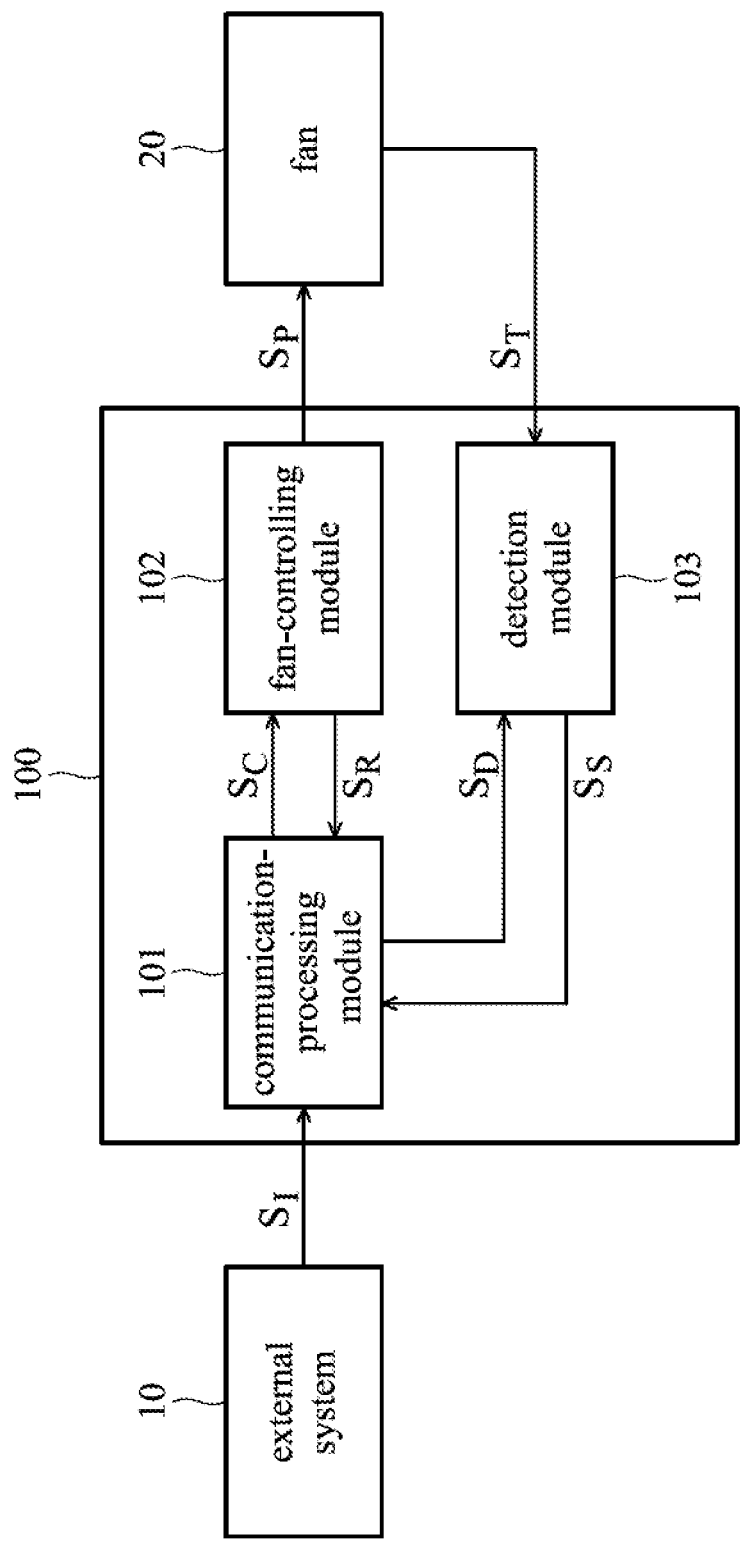
FIG. 1 is a block diagram of the fan control device in accordance with an embodiment of the invention.

FIG. 1 is a block diagram of the fan control device in accordance with an embodiment of the invention. As shown in FIG. 1, the fan control device 100 includes the communication-processing module 101, the fan-controlling module 102, and the detection module 103. The communication-processing module 101 receives the fan-controlling instruction $S_I$ transmitted from the external system 10 to generate the control signal $S_C$. After receiving the control signal $S_C$, the fan-controlling module 102 immediately notifies the communication-processing module 101 by the control result of the report signal $S_R$ that the adjustment and the control have been successfully accomplished. According to an embodiment of the invention, the fan-controlling module 102 controls the speed, and starts or stops the fan 20 by the physical signal $S_P$, and it will be described in detail by an embodiment in the following. According to an embodiment of the invention, the physical signal $S_P$ is a PWM control signal or a control voltage.

The communication-processing module 101 further generates the detection signal $S_D$ according to the detection request of the fan-controlling instruction $S_I$ transmitted from the external system 10. When the detection module 103 receives the detection signal $S_D$, the sensor (not shown in FIG. 1) of the detection module 103 immediately receives the sensor signal $S_T$ transmitted from the fan 20 to get the instant state information of the fan 20, and the detection module 103 transmits the state information to the communication-processing module 101 by the state signal $S_S$. the external system 10 can display the state information transmitted to the communication-processing module 101 according to the request of an user. According to an embodiment of the invention, the sensor signal $S_T$ is one or any combination of a voltage signal, a current signal, a signal with a series of pulses, and a temperature signal.

According to an embodiment of the invention, the state information includes the fan state of the fan 20 and the ambient state at that time. The fan state of the fan 20 includes the information of the temperature, the speed, the voltage, the current, and so on of the fan 20. The ambient state includes the ambient temperature at that time. According to an embodiment of the invention, the fan-controlling module 102 and the detection module 103 are physically separated from each other, and there is no data transmission therebetween. According to another embodiment of the invention, the communication-processing module 101, the fan-controlling module 102, and the detection module 103 are individually packaged.

Figure 2:
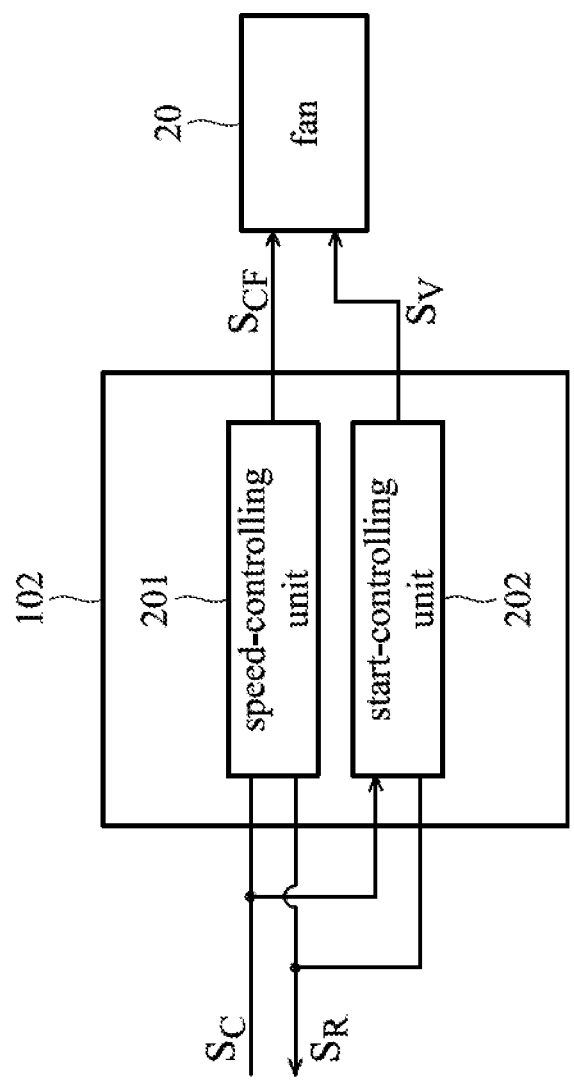
FIG. 2 is a block diagram of the fan-controlling module in accordance with an embodiment of the invention.

FIG. 2 is a block diagram of the fan-controlling module in accordance with an embodiment of the invention. As shown in FIG. 2, the fan-controlling module 102 includes the speed-controlling unit 201 and the start-controlling unit 202. The speed-controlling unit 201 generates the fan-control signal $S_{CF}$ according to the control signal $S_C$, in order to control the speed of the fan 20. When the speed-controlling unit 201 controls the speed of the fan 20, the speed-controlling unit 201 immediately notifies the communication-processing module 101 by the report signal $S_R$ that the action of controlling has been successfully accomplished. According to an embodiment of the invention, the fan-control signal $S_{CF}$ is a PWM signal or a voltage signal.

The start-controlling unit 202 generates the voltage signal $S_V$ according to the control signal $S_C$, in order to control the fan 20 to start or stop. When the start-controlling unit 202 starts or stops the fan 20, the start-controlling unit 202 immediately notifies the communication-processing module 101 by the report signal $S_R$ that the action of starting or stopping has been successfully accomplished. According to an embodiment of the invention, the speed-controlling unit 201 and the start-controlling unit 202 are physically separated from each other, and both are operated independently without communication therebetween. According to another embodiment of the invention, the speed-controlling unit 201 and the start-controlling unit 202 are packaged individually. According to an embodiment of the invention, the voltage $S_V$ is 0V or 5V when the operation voltage is 5V.

The functions of the speed-controlling and the start-controlling herein are described for illustration. The fan-controlling module includes the functions of controlling a fan that are invented afterward and not intend to be limited thereto.

Figure 3:
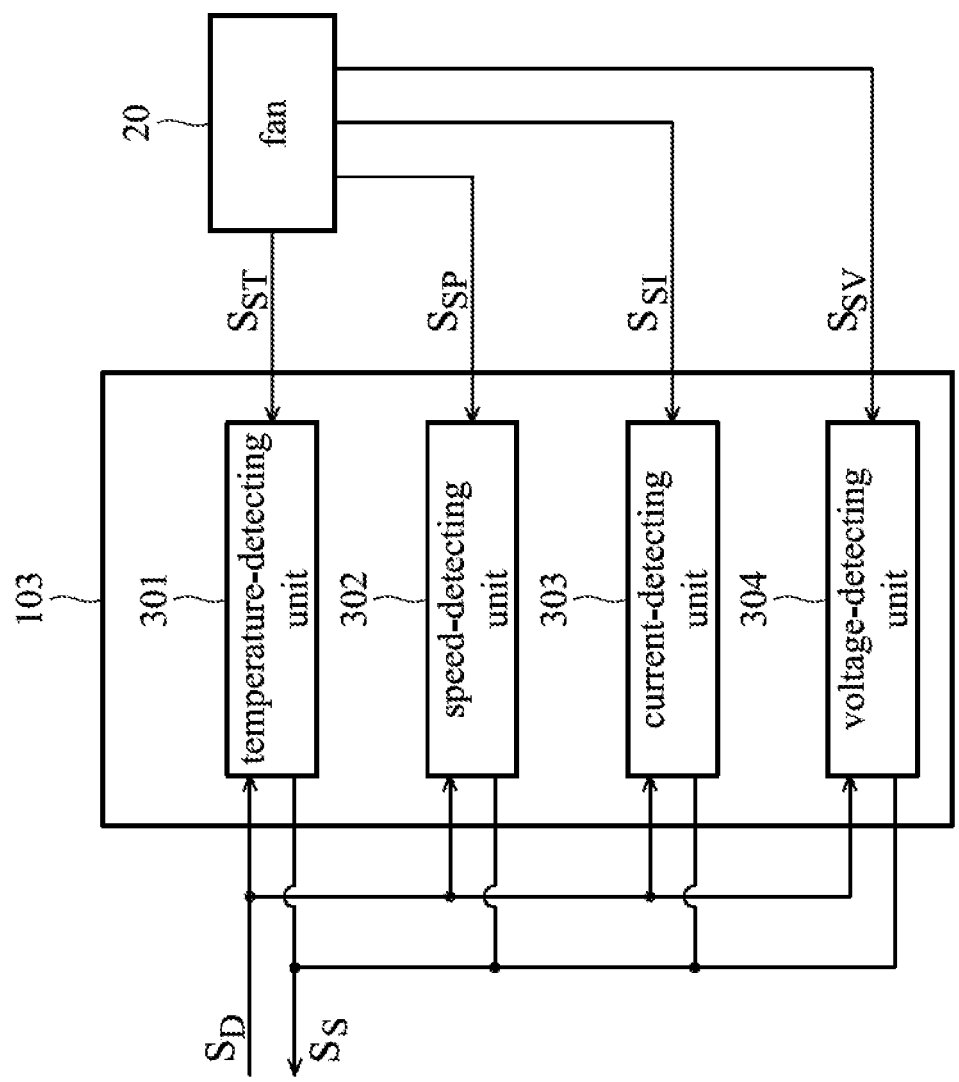
FIG. 3 is a block diagram of the detection module in accordance with an embodiment of the invention.

FIG. 3 is a block diagram of the detection module in accordance with an embodiment of the invention. The detection module 103 includes the temperature-detecting unit 301, the speed-detecting unit 302, the current-detecting unit 303, and the voltage-detecting unit 304, in which each of the temperature-detecting unit 301, the speed-detecting unit 302, the current-detecting unit 303, and the voltage-detecting unit 304 includes an individual sensor (not shown in FIG. 3) on the fan 20.

When the temperature-detecting unit 301 receives the detection signal $S_D$ generated by the communication-processing module 101, the temperature-detecting unit 301 receives the temperature detection signal $S_{ST}$ generated by the sensor on the fan 20 according to the detection signal $S_D$, in order to receive the temperature information. According to an embodiment of the invention, the temperature information includes the information of the ambient temperature and the temperature of the fan 20. When the speed-detecting unit 302 receives the detection signal $S_D$, the speed-detecting unit 302 receives the serial-pulse signal $S_{SP}$ generated by the sensor on the fan 20, in order to receive the speed information of the fan 20. When the current-detecting unit 303 receives the detection signal $S_D$, the current-detecting unit 303 receives the current-detecting signal $S_{SI}$ generated by the sensor on the fan 20, in order to receive the current information of the fan 20. When the voltage-detecting unit 304 receives the detection signal $S_D$, the voltage-detecting unit receives the voltage-detecting signal $S_{SV}$ generated by the sensor on the fan 20, in order to receive the voltage information.

By the state signal $S_S$, the temperature-detecting unit 301, the speed-detecting unit 302, the current-detecting unit 303, and the voltage-detecting unit 304 respectively transmit the temperature information, the speed information, the current information, and the voltage information to the communication-processing module 101. According to an embodiment of the invention, the temperature-detecting unit 301, the speed-detecting unit 302, the current-detecting unit 303, and the voltage-detecting unit 304 are physically separated from one another. According to another embodiment of the invention, the temperature-detecting unit 301, the speed-detecting unit 302, the current-detecting unit 303, and the voltage-detecting unit 304 are individually packaged.

According to an embodiment of the invention, the detection module of the invention is not limited to detect temperature, speed, current, and voltage, and the detected items should be added according to the application field of the fan control device. The invention should not be taken in a limiting sense.

For the sake of clearly explaining the usage of the fan control device of the invention, a cooling fan is illustrated as an example in the following, and FIGS. 1-3 are referenced for further explanation. In addition, the cooling fan is illustrated as an embodiment of the fan control device, but not limited thereto.

According to an embodiment, the external system 10 is a human-computer interface system. When a user sets the temperature to be 30 degrees by the human-computer interface system, the human-computer interface system immediately transmits the fan-controlling instruction $S_I$ to the communication-processing module 101. When receiving the fan-controlling instruction $S_I$, the communication-processing module 101 requests, by the detection signal $S_D$, the temperature-detecting unit 301 to receive the temperature detection signal $S_{ST}$ for detecting the ambient temperature and the temperature of the fan 20. After detection, the temperature-detecting unit 301 transmits the temperature information of the temperature detection signal $S_{ST}$ to the communication-processing module 101 by the state signal $S_S$.

According to an embodiment of the invention, when the communication-processing module 101 receives the temperature information, the communication-processing module 101 is aware of the ambient temperature being 35 degrees to determine that the ambient temperature is higher than that set by the user, such that the fan 20 needs to be started for cooling. Therefore, the control signal $S_C$ is transmitted to the start-controlling unit 202, and then the voltage signal $S_V$ is transmitted to start the fan 20. In addition, the speed-controlling unit 201 is also controlled by the control signal $S_C$ to generate the fan-control signal $S_{CF}$ for adjusting the speed of the fan 20 to a proper speed. When the speed-controlling unit 201 and the start-controlling unit 202 accomplish the controlling, the speed-controlling unit 201 and the start-controlling unit 202 both notify, by the report signal $S_R$, the communication-processing module 101 that the controlling has been successfully accomplished.

According to an embodiment of the invention, when the communication-processing module 101 reports that the temperature of the fan 20 exceeds the safety range according to the temperature-detecting signal $S_{ST}$ received by the temperature-detecting unit 301, the communication-processing module 101 immediately transmits the control signal $S_C$ to lower the speed of the fan by the fan-control signal $S_{CF}$ generated by the speed-controlling unit 201, or to stop the fan 20 by the voltage signal $S_V$ generated by the start-controlling unit 202 and to restart the fan 20 according to the temperature-detecting signal $S_{ST}$ received by the temperature-detecting unit 301 when the temperature of the fan 20 is back to normal.

According to an embodiment of the invention, the communication-processing module 101 could instantly adjust the operation of the fan 20 by the physical signal $S_P$ generated by the fan-controlling module 102 according to the ambient state and the fan state of the fan 20 of the sensor signal $S_T$ received by the detection module 103. According to another embodiment of the invention, the communication-processing module 101 could request the detection module 103 by the detection signal $S_D$ to stop collecting the state information (i.e., to stop receiving the sensor signal $S_T$) for the sake of reducing power consumption. According to yet another embodiment of the invention, the communication-processing module 101 could request the detection module 103 to collect the state information (i.e., to receive the sensor signal $S_T$) in a predetermined time interval and determine whether the adjustment of the fan 20 is required.

According to an embodiment of the invention, the user could request the detection module 103 to collect the state information (i.e., to receive the sensor signal $S_T$) by the human-computer interface system (i.e., the external system 10) and display the instant state information of the detection signal $S_T$ on the human-computer interface system (i.e., the external system 10) for the user's interpretation.

The invention provides a fan control device with multi-processor, in which each function is processed by a single processing module with a single function. According to an embodiment of the invention, the processing module with a single function is a circuit with a single function or a microprocessor with a single function. Since a circuit or a processor with a single function is much easier to be designed, the complexity of the processing module is greatly reduced, such that the efficiency of designing and cooling of the processing module is thus improved, and the overall cost is significantly reduced.

Regarding the conventional method of integrating all the functions of control, detection, and communication into a single processing module on the market, since it is very complicated between various functions, a lot of human resources and time are spent clarifying whether the unexpected effect could have occurred by the interactions between various functions. Otherwise, the processing module would be unexpectedly damaged. In addition, since all the functions are integrated into a processing module, the heating power of the processing module should be raised accordingly. When there are more functions in a processing module, even an additional fan is required for cooling.

The invention dismantles all the control functions into an individual processing module (could be a circuit of a processor), the communication-processing module is in charge of the communication among processing modules and the communication with the external system. Each of the control unit and the detection unit are physically separated from each other. That is, each of the control unit and the detection unit is only in charge of its own controlling or detecting task. If all the control and detection functions are dismantled into an independent unit, the design complexity is significantly lowered and the design cost is therefore reduced. In addition, when a single processing module is dismantled into several processing modules, the heat dissipating area is significantly enlarged, such that the cost of the heat dissipation is thus reduced and the overall cost of production is reduced as well. Accordingly, the production efficiency is improved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A fan control device for controlling a fan comprising:
   a communication-processing processor, receiving a fan-controlling instruction from an external system to generate a control signal, generating a detection signal according to a detection request of the external system, and providing state information for the external system, wherein the fan-controlling instruction is in response to a temperature threshold set by a user through the external system;
   a fan-controlling module, comprising:
      a speed-controlling unit, controlling a speed of the fan according to the control signal when an ambient temperature exceeds the temperature threshold, and transmitting a control result to the communication-processing processor; and
      a start-controlling unit, activating the fan according to the control signal when the ambient temperature exceeds the temperature threshold, and transmitting a report signal to the communication-processing processor, wherein the report signal indicates that the fan has been successfully started or stopped; and
   a detection module, comprising:
      a temperature-detecting unit, detecting temperature information according to the detection signal, wherein the temperature information comprises the ambient temperature and a fan temperature;
      a speed-detecting unit, detecting speed information of the fan according to the detection signal;
      a current-detecting unit, detecting current information of the fan according to the detection signal; and
      a voltage-detecting unit, detecting voltage information of the fan according to the detection signal, wherein each of the temperature-detecting unit, the speed-detecting unit, the current-detecting unit, and the voltage-detecting unit comprises a sensor, and the communication-processing processor, the speed-controlling unit, the start-controlling unit, temperature-detecting unit, the speed-detecting unit, the current-detecting unit, and the voltage-detecting unit are physically separated from one another and are operated to perform their functions individually;
   wherein there is no direct data transmission between the fan-controlling module and the detection module.

2. The fan control device of claim 1, wherein any one of the communication-processing processor, the speed-controlling unit, the start-controlling unit, the temperature-detecting unit, the speed-detecting unit, the current-detecting unit, and the voltage-detecting unit is individually packaged.

3. The fan control device of claim 1, wherein the external system is a human-computer interface system, the human-computer interface system generates the fan-controlling instruction according to an operation instruction of a user, and the speed of the fan is controlled by the control signal generated by the communication-processing processor, wherein the human-computer interface system further generates the detection request according to the operation instruction, requests the detection processor to detect the ambient state and a fan state of the fan by the communication-processing processor generating the detection signal, and then the human-computer interface system displays the state information transmitted by the communication-processing processor.

* * * * *